United States Patent
Yang

(10) Patent No.: US 12,045,497 B2
(45) Date of Patent: Jul. 23, 2024

(54) DISK STORAGE-BASED DATA READING METHODS AND APPARATUSES, AND DEVICES

(71) Applicant: Ant Blockchain Technology (Shanghai) Co., Ltd., Shanghai (CN)

(72) Inventor: Xinying Yang, Hangzhou (CN)

(73) Assignee: Ant Blockchain Technology (Shanghai) Co., Ltd., Shanghai (CN)

(*) Notice: Subject to any disclaimer, the term of this patent is extended or adjusted under 35 U.S.C. 154(b) by 26 days.

(21) Appl. No.: 17/723,117

(22) Filed: Apr. 18, 2022

(65) Prior Publication Data
US 2022/0236910 A1    Jul. 28, 2022

Related U.S. Application Data

(63) Continuation of application No. PCT/CN2020/109273, filed on Aug. 14, 2020.

(30) Foreign Application Priority Data

Oct. 18, 2019 (CN) .......................... 201910992775.4

(51) Int. Cl.
G06F 12/00 (2006.01)
G06F 3/06 (2006.01)
G06F 13/00 (2006.01)

(52) U.S. Cl.
CPC .......... G06F 3/0655 (2013.01); G06F 3/0604 (2013.01); G06F 3/0676 (2013.01)

(58) Field of Classification Search
CPC ..... G06F 3/0655; G06F 3/0604; G06F 3/0676
(Continued)

(56) References Cited

U.S. PATENT DOCUMENTS 4,490,782 A * 12/1984 Dixon ................... G06F 13/122
                                                711/158
4,533,995 A *  8/1985 Christian ............ G06F 12/0866
                                                711/E12.019
(Continued)

FOREIGN PATENT DOCUMENTS

CN        103500224        1/2014
CN        104778015        7/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

Primary Examiner — Sheng Jen Tsai
(74) Attorney, Agent, or Firm — Fish & Richardson P.C.

(57) ABSTRACT

One or more embodiments of the present specification provide disk storage-based data reading methods, apparatuses, and systems. A data reading instruction sent by a client device is received. The data reading instruction includes a service attribute. Location information corresponding to the service attribute is obtained from a pre-stored index table. The location information includes block heights and offsets of data blocks in which one or more data records are located. A block height sequence is generated by sequentially arranging the block heights. Mutually exclusive continuous block height intervals are determined from the block height sequence. One or more target data blocks are read corresponding to a block height interval from a disk. The one or more data records are obtained by querying the one or more target data blocks based on the location information, and returned to the client device.

20 Claims, 6 Drawing Sheets

(58) Field of Classification Search
USPC .......................................................... 711/154
See application file for complete search history.

(56) References Cited

U.S. PATENT DOCUMENTS

| | | | | |
|---|---|---|---|---|
| 4,583,166 | A * | 4/1986 | Hartung | G06F 12/0866 |
| | | | | 711/E12.019 |
| 4,625,081 | A * | 11/1986 | Lotito | H04M 3/533 |
| | | | | 379/88.19 |
| 4,636,946 | A * | 1/1987 | Hartung | G06F 12/123 |
| | | | | 711/E12.04 |
| 6,144,969 | A * | 11/2000 | Inokuchi | G06F 16/166 |
| | | | | 707/999.001 |
| 7,058,783 | B2 * | 6/2006 | Chandrasekaran | G06F 16/10 |
| | | | | 711/171 |
| 10,454,498 | B1 * | 10/2019 | Mao | H03M 7/6023 |
| 10,783,277 | B2 * | 9/2020 | Li | G06F 21/6272 |
| 11,089,105 | B1 * | 8/2021 | Karumbunathan | G06F 16/275 |
| 11,327,676 | B1 * | 5/2022 | Fernandez | G06F 12/0862 |
| 11,528,611 | B2 * | 12/2022 | Smith | H04L 67/12 |
| 11,550,762 | B2 * | 1/2023 | Brendle | G06F 16/24575 |
| 11,574,290 | B2 * | 2/2023 | Liu | H04L 9/50 |
| 11,575,503 | B2 * | 2/2023 | Ishigaya | H04L 9/3247 |
| 11,614,994 | B2 * | 3/2023 | Deng | H04L 9/3239 |
| | | | | 714/776 |
| 11,616,637 | B2 * | 3/2023 | Castinado | H04L 9/0618 |
| | | | | 713/169 |
| 11,698,840 | B2 * | 7/2023 | Liao | H04L 9/14 |
| | | | | 707/682 |
| 2003/0004883 | A1 * | 1/2003 | Koyata | G11B 20/00 |
| 2008/0307192 | A1 * | 12/2008 | Sinclair | G06F 12/0246 |
| | | | | 711/218 |
| 2009/0271562 | A1 * | 10/2009 | Sinclair | G06F 12/0246 |
| | | | | 711/E12.008 |
| 2009/0307251 | A1 * | 12/2009 | Heller | G06F 16/2379 |
| | | | | 707/999.102 |
| 2010/0153617 | A1 * | 6/2010 | Miroshnichenko | G06F 3/061 |
| | | | | 718/1 |
| 2014/0214760 | A1 * | 7/2014 | Bashyam | G06F 16/27 |
| | | | | 707/613 |
| 2018/0139278 | A1 * | 5/2018 | Bathen | H04L 9/3247 |
| 2019/0121988 | A1 * | 4/2019 | van de Ruit | H04L 9/0825 |
| 2019/0243816 | A1 * | 8/2019 | Gaumnitz | G06F 16/951 |
| 2019/0349426 | A1 * | 11/2019 | Smith | H04L 67/562 |
| 2019/0373472 | A1 * | 12/2019 | Smith | H04W 4/70 |
| 2020/0004737 | A1 * | 1/2020 | Qiu | G06F 16/245 |
| 2020/0004788 | A1 * | 1/2020 | Qiu | G06F 16/9014 |
| 2020/0201833 | A1 * | 6/2020 | Yang | G06F 16/24558 |
| 2020/0204348 | A1 * | 6/2020 | Yang | H04L 9/3239 |
| 2020/0204560 | A1 * | 6/2020 | Yang | H04L 9/3073 |
| 2020/0210410 | A1 * | 7/2020 | Li | G06F 16/2379 |
| 2020/0334382 | A1 * | 10/2020 | Yang | G06F 16/901 |
| 2022/0019350 | A1 * | 1/2022 | Karr | G06F 3/0604 |
| 2022/0027051 | A1 * | 1/2022 | Kant | G06F 3/0605 |
| 2022/0334725 | A1 * | 10/2022 | Mertes | G06F 16/275 |

FOREIGN PATENT DOCUMENTS

| | | |
|---|---|---|
| CN | 109714412 | 5/2019 |
| CN | 109739843 | 5/2019 |
| CN | 110008203 | 7/2019 |
| CN | 110162523 | 8/2019 |
| CN | 110162526 | 8/2019 |
| CN | 110162662 | 8/2019 |
| CN | 110175188 | 8/2019 |
| CN | 110190963 | 8/2019 |
| CN | 110879687 | 3/2020 |

OTHER PUBLICATIONS

Nakamoto, "Bitcoin: A Peer-to-Peer Electronic Cash System," www.bitcoin.org, 2005, 9 pages.
PCT International Preliminary Report on Patentability in PCT Application No. PCT/CN2020/109273, dated Apr. 19, 2022, 12 pages (with English translation).
PCT International Search Report and Written Opinion in PCT Application No. PCT/CN2020/109273, dated Nov. 12, 2020, 13 pages (with English translation).
Han et al., "DBCC-Join: A novel cache-conscious disk-based join algorithm," Jisuanji Xuebao(Chinese Journal of Computers), Aug. 2010, 33(8): 1500-11 (with English abstract).
Wang et al., "Design and Research of Data Packets Transmission by Shared Memory Block Based on NDIS," In 2013 IEEE 9th International Conference on Mobile Ad-hoc and Sensor Networks, Dec. 11, 2013, p. 550-554 (abstract only).

* cited by examiner

DISK STORAGE-BASED DATA READING METHODS AND APPARATUSES, AND DEVICES

CROSS-REFERENCE TO RELATED APPLICATIONS

This application is a continuation of PCT Application No. PCT/CN2020/109273, filed on Aug. 14, 2020, which claims priority to Chinese Patent Application No. 201910992775.4, filed on Oct. 18, 2019, and each application is hereby incorporated by reference in its entirety.

TECHNICAL FIELD

Embodiments of this specification relate to the field of information technology, and in particular, to disk storage-based data reading methods and apparatuses, and devices

BACKGROUND

At a database server that provides external services with a centralized blockchain-type ledger, the ledger is persistently stored in a disk. Therefore, during data reading, a user needs to read data from the disk. Due to a feature of the blockchain-type ledger, the data of the user may be randomly distributed in sectors of the disk, and there is low efficiency if a common reading method is used.

Based on this, a data reading solution for improving efficiency in the blockchain-type ledger is needed.

SUMMARY

Embodiments of this application are intended to provide a more efficient disk storage-based data reading solution.

To resolve the previous technical problem, the embodiments of this application are implemented as follows:

A disk storage-based data reading method is provided, and includes: a data reading instruction sent by a client device is received, where the reading instruction includes a service attribute; a set of location information corresponding to the service attribute is obtained from a pre-stored index table, where the location information includes block heights of data blocks in which data records are located and offsets in the data blocks in which the data records are located; the block heights are sequentially arranged, to generate a block height sequence, and M mutually exclusive continuous block height intervals are determined from the block height sequence; data blocks corresponding to any block height interval are read from a disk; and the data blocks corresponding to the block height interval are queried based on the set of location information, to obtain data records, and the data records are returned to the client device.

Correspondingly, embodiments of this specification further provide a disk storage-based data reading apparatus, including: a receiving module, configured to receive a data reading instruction sent by a client device, where the reading instruction includes a service attribute; a location information acquisition module, configured to obtain a set of location information corresponding to the service attribute from a pre-stored index table, where the location information includes block heights of data blocks in which data records are located and offsets in the data blocks in which the data records are located; a block height interval generation module, configured to sequentially arrange the block heights, to generate a block height sequence, and determine M mutually exclusive continuous block height intervals from the block height sequence; a data block reading module, configured to read data blocks corresponding to any block height interval from a disk; and a data record reading module, configured to query the data blocks corresponding to the block height interval based on the set of location information, to obtain data records, and return the data records to the client device.

In the solution provided in the embodiments of this specification, when a database server reads data from the disk, block heights corresponding to a service attribute are first sorted, to obtain a block height sequence, then a plurality of block height intervals are obtained from the block height sequence, and full data blocks corresponding to the block height intervals are continuously read from the disk, and then data records are read from the data blocks based on location information. As such, a quantity of times a track is changed is reduced during reading from the disk, and input/output (IO) efficiency of the disk is improved, and therefore efficiency of reading the blockchain-type ledger stored in the disk is improved.

It should be understood that the previous general description and the following detailed description are merely illustrative and explanatory, and constitute no limitation on the embodiments of this specification.

In addition, any one of the embodiments of this specification does not need to achieve all the effects described above.

BRIEF DESCRIPTION OF DRAWINGS

To describe the technical solutions in the embodiments of this specification or in the existing technology more clearly, the following briefly describes the accompanying drawings needed for describing the embodiments or the existing technology. Clearly, the accompanying drawings in the following description are merely some of the embodiments described in the embodiments of this specification. A person of ordinary skill in the art can further derive other drawings from these accompanying drawings.

DESCRIPTION OF EMBODIMENTS

To make a person skilled in the art better understand the technical solutions in the embodiments of this specification, the following describes the technical solutions in the embodiments of this specification in detail with reference to the accompanying drawings in the embodiments of this specification. Clearly, the described embodiments are merely some but not all of the embodiments of this specification. All other embodiments obtained by a person of ordinary skill in the art based on the embodiments of this specification shall fall within the protection scope.

Figure 1:
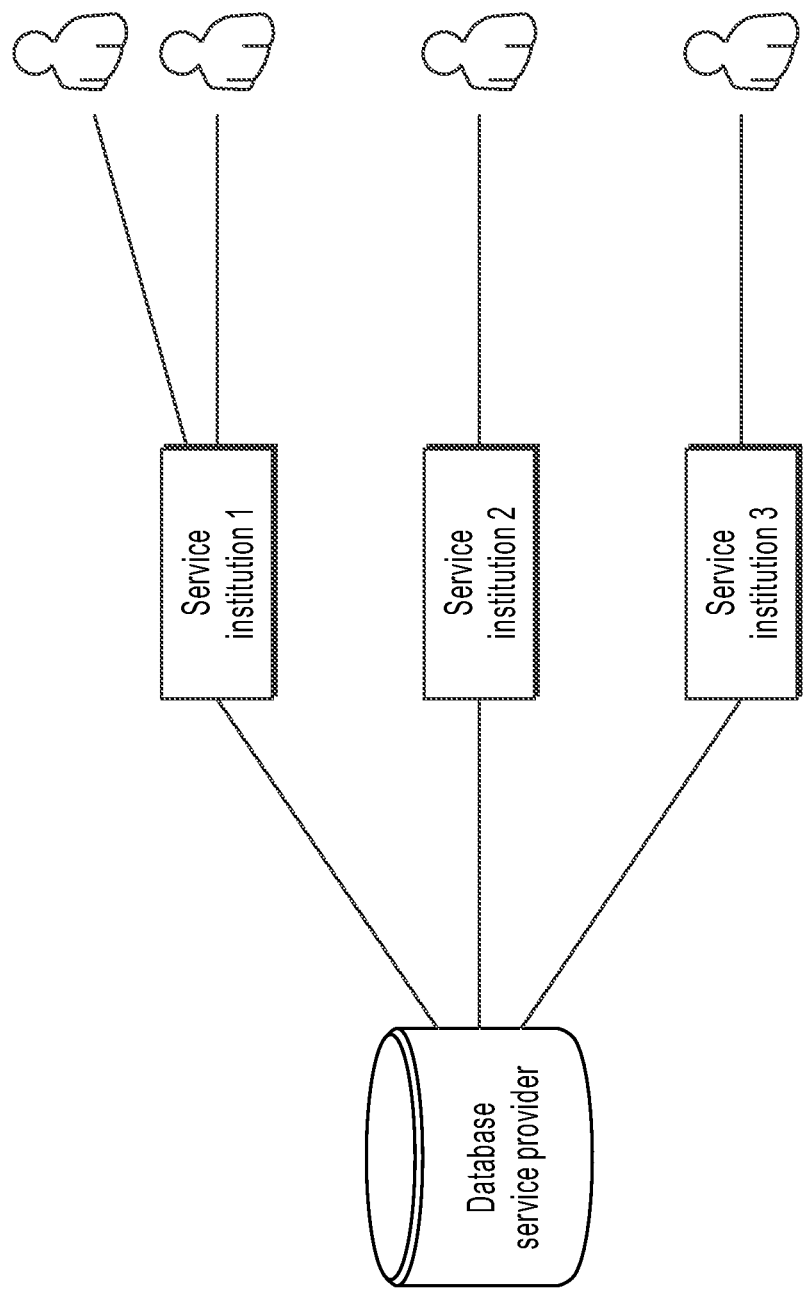
FIG. 1 is a schematic diagram illustrating a system architecture, according to embodiments of this specification.

A blockchain-type ledger in embodiments of this specification is first described. A database server is usually oriented to various institutions, and the institutions can store data records generated between the institutions and third-party users (including other institutions or individuals) in the database server. FIG. 1 is a schematic diagram illustrating a system architecture, according to embodiments of this specification. In the schematic diagram, one enterprise can be oriented to a plurality of users, and each user can make a query with a database service provider through an enterprise corresponding to the user.

For example, if the database server is connected to a certain financial product company, the data record can be a financial record of an individual user in the financial product company. Alternatively, the database server may be connected to a government department, and the data record is expense details of the government department for a public project managed by the department. Alternatively, if the database server is connected to a certain hospital, the data record is a medical record of a patient. Alternatively, if the database server is connected to a third-party payment institution, the data record can be a record of payment made by an individual user through the institution.

Figure 2:
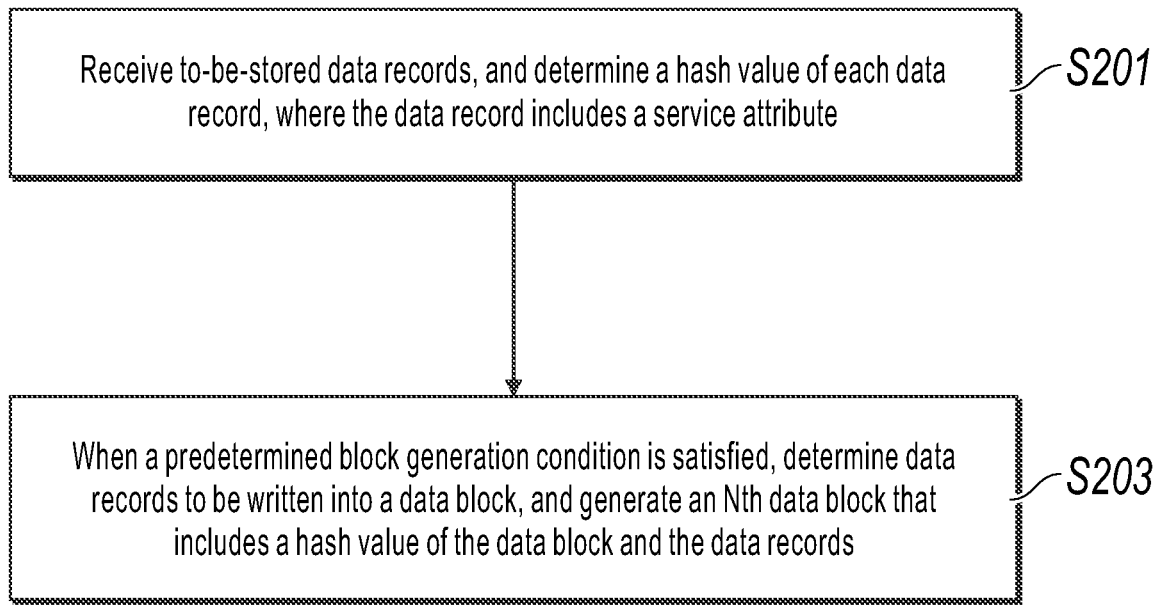
FIG. 2 is a schematic diagram illustrating a procedure of generating a blockchain-type ledger, according to embodiments of this specification.

At the centralized database server, the blockchain-type ledger is generated by using the following method. FIG. 2 is a schematic diagram illustrating a procedure of generating a blockchain-type ledger, according to embodiments of this specification. The procedure includes S201 and S203.

S201. Receive to-be-stored data records, and determine a hash value of each data record, where the data record includes a service attribute.

The to-be-stored data record here can be various expense records of an individual user on a client device, or can be a service result, an intermediate status, an operation record, etc. generated when an application server executes service logic based on an instruction of a user. A specific service scenario can include an expense record, an audit log, a supply chain, a government regulatory record, a medical record, etc.

In each institution connected to a database server, the service attribute is usually unique. Based on different service scenarios, the service attribute can include a user name, a user identity card number, a driver's license number, a mobile phone number, an unique project number, a type of the data record (for example, a financial package number), etc.

For example, for a third-party payment institution, the data record is an expense record of a user, and the service attribute in this case is a user identifier (including a mobile phone number, an identity card number, a user name, etc.) or a hash value obtained after a hash algorithm is performed on the user identifier. Alternatively, for a government agency, the data record is an expense journal for a plurality of public projects, and the service attribute in this case can be a unique number for each project.

The service attribute can be stored at a specified location in the data record, for example, a header or a tail of the data record.

When a predetermined block generation condition is satisfied, determine data records to be written into a data block, and generate an Nth data block that includes a hash value of the data block and the data records.

The predetermined block generation condition includes: a quantity of to-be-stored data records reaches a quantity threshold. For example, a new data block is generated each time 1000 data records are received, and the 1000 data records are written into the block. Alternatively, the predetermined block generation condition includes: a time interval from a previous block generation moment reaches a time threshold. For example, a new data block is generated every 5 minutes, and data records received within the 5 minutes are written into the block.

N here refers to a sequence number of the data block. In other words, in the embodiments of this specification, data blocks are in a block chaining form, arranged based on a block generation time order, and have strong timing features. A block height of the data block monotonically increases based on the block generation time order. The block height can be a sequence number. In this case, a block height of the Nth data block is N. Alternatively, the block height can be generated in another way. For example, a block generation time is converted into large integer data (for example, a 12-bit or 15-bit integer) through symmetric encryption, and the large integer data is used as the block height.

When the data block in this case is an initial data block. The hash value and the block height of the initial data block are given based on a predetermined method. For example, the initial data block includes no data record, and in this case, the hash value is any given hash value, and the block height blknum is equal to 0. For another example, a trigger condition for generating the initial data block is the same as a trigger condition for another data block, but the hash value of the initial data block is determined after hashing is performed on all content in the initial data block.

When N>1, content and a hash value of a previous data block are determined, and therefore a hash value of a current data block (the Nth data block) can be generated based on the hash value of the previous data block (namely, an (N−1)th data block). For example, in a feasible manner, a hash value of each data record to be written into the Nth block is determined, a Merkel tree is generated based on an order of arrangement in the block, a root hash value of the Merkel tree and the hash value of the previous data block are spliced, and a hash algorithm is used again to generate the hash value of the current block. For another example, splicing and hashing can be performed based on an order of the data records in the block, to obtain a hash value of the whole data record, the hash value of the previous data block and the hash value of the whole data record are spliced, and a hash operation is performed on a string obtained through splicing, to generate the hash value of the data block.

After a user successfully uploads data, a hash value of a corresponding data record and a hash value of a data block in which the data record is located can be obtained and stored, and integrity verification can be initiated based on the hash value. A specific verification method is to recalculate, in the database, the hash value of the data record and the hash value of the data block in which the data record is located, and compare the hash values with the locally stored hash values.

In the previous method for generating a data block, each data block is determined by using a hash value, and the hash value of the data block is determined by using content in a data record in the data block, an order, and a hash value of a previous data block. The user can initiate verification based on the hash value of the data block at any time, and modification to any content (including modification to the content in the data record in the data block or the order) in the data block results in an inconsistence between a hash value of the data block that is calculated during verification and the hash value that exists when the data block is generated, and consequently verification fails, thereby implementing tamper-resistance in the case of centralization.

During verification on a blockchain-type ledger, usually, a data block is designated for continuous integrity verification, or continuous integrity verification is performed starting from an initial data block. A verification method is to obtain a hash value of a previous data block, and recalculate a hash value of the data block based on a data record in the data block and the hash value of the previous data block by using an algorithm the same as that used to generate the hash value of the data block, to perform verification.

Figure 3:
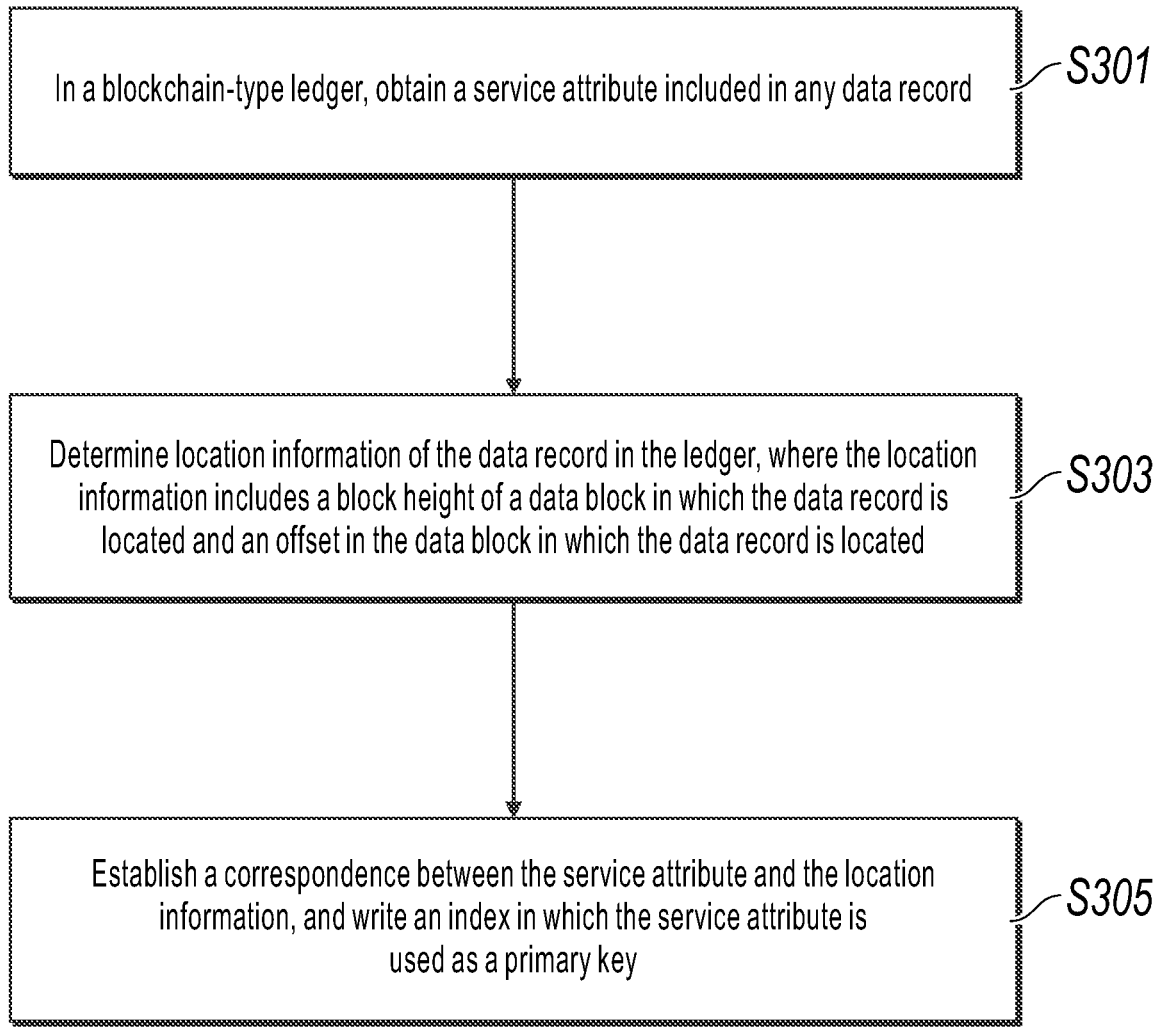
FIG. 3 is a schematic diagram illustrating a procedure of an index creation method for a data record, according to embodiments of this specification.

Based on the previous method, a blockchain-type ledger that is difficult to tamper with can be obtained for storing data. To facilitate data query, embodiments of this specification further provide an index creation method for a blockchain-type ledger. FIG. 3 is a schematic diagram illustrating a procedure of an index creation method for a data record, according to embodiments of this specification. The procedure specifically includes the following steps S301 to S305.

S301. In a blockchain-type ledger, obtain a service attribute included in any data record.

A specific location of the service attribute and a method for obtaining the service attribute can be negotiated in advance between a database server and a connected institution. For example, when the data record provided by the connected institution is a standard structured data record, the service attribute can be obtained from the data record by a specified offset or by a start location and an end location of a specific character identifier. Alternatively, when the data record provided by the connected institution is unstructured data, during uploading, the connected institution can directly add a header of the service attribute to a header of each data record through splicing, and the database server can directly obtain the service attribute in each data record from the header.

Determine location information of the data record in the ledger, where the location information includes a block height of a data block in which the data record is located and an offset in the data block in which the data record is located.

As described above, one blockchain-type ledger includes a plurality of data blocks, and one data block usually includes a plurality of data records. Therefore, in the embodiments of this specification, the location information specifically refers to a data block, in the ledger, in which the data record is stored and a location of the data record in the data block.

In the data blocks provided in the embodiments of this specification, different data blocks can be identified by using various methods, including a hash value or a block height of the data block.

The hash value of the data block is a hash value obtained after hashing is performed based on a hash value of a previous block and a data record in the data block, and can be used to uniquely and explicitly identify the data block. In the blockchain-type ledger, a block height of a first data block is usually 0, and the block height is increased by 1 each time a data block is added. Alternatively, a block generation time of the data block can be converted into a large monotonically increasing integer data (typically 12-15 bits) sequence, and the data sequence can be used as the block height of the data block. Therefore, there is usually a definite block height for a data block.

For another example, there is a fixed sorting order for data records in a data block that is determined to be written into a database, and therefore there is a clear sequence number for the data record in the data block. When a length of the data record is in a fixed unit, the sequence number can also be used to specify location information of the data record in the data block in which the data record is located. In other words, the sequence number can also be used to indicate an offset of the data record in the data block.

In addition, one data block usually includes a plurality of data records, and therefore the data records in the data block can also be respectively identified by address offsets of the data records in the data block. Clearly, in the same data block, there are different address offsets for data records.

Certainly, in the method provided in the embodiments of this specification, a specific format (for example, metadata information and comment information included in a block header of the data block and a form of the block height of the data block) can be customized. Content of the location information varies with the format, and this constitutes no limitation on this solution.

S305. Establish a correspondence between the service attribute and the location information, and write an index in which the service attribute is used as a primary key.

In other words, the index is an inverted index. In the index, the primary key is the service attribute included in the data record. A specific writing method is as follows: When the primary key in the index does not include a specified identification field, an index record in which the specified identification field is used as the primary key is created in an index table.

When the primary key in the index includes the specified identification field, the location information is written into an index record in which the specified identification field is located. It is worthwhile to note that the writing here is not overwriting. Instead, the location information is added to a value in the index record, and exists in parallel with other location information in the index record.

Table 1 illustrates an example index table, according to embodiments of this specification. Here, Key is a specific value of a service attribute, each array in a Value part is a piece of location information, a former part in each array is a block height, and a latter part is a sequence number of a data record in a data block. The data record can be uniquely determined by using the block height and the sequence number. It is easy to understand that one key can correspond to a plurality of pieces of location information in the index table.

TABLE 1

| Key | Value |
| --- | --- |
| 0X123456 | (2, 08), (2, 10), (300, 89), (300, 999) |
| 344X0001 | (5, 01), (8, 22) |
| ... | ... |

In the solution provided in the embodiments of this specification, a service attribute in a data record written into the ledger and a storage location of the data record in the ledger are determined; a correspondence between the service attribute and the storage location is established; and an inverted index in which the service attribute is used as a primary key is created. As such, there is no need to know service details of a user, and corresponding statistics collection on the data record and subsequent query and verification can be performed based on the service attribute in the index.

In the index table, one service attribute can correspond to a plurality of pieces of location information (in other words, one index record can include a plurality of pieces of location information, or one service attribute can correspond to a plurality of data records). Therefore, when the location information is written into the index, the location information can be sequentially arranged based on an order of data records in the ledger, to facilitate query and verification for the user. The order of the data records in the ledger can be represented by timestamps (namely, block generation timestamps of the data blocks) for writing the data records into the ledger, and an order of data records in the same data block can be represented by a sorting order of the data records in the data block. The location information is sorted, so that the corresponding data records can be sequentially obtained when the data records are queried and read, to improve user experience.

After the index table is created, status query and statistics collection on the service attribute can be performed based on the index table. For example, a query request (usually, the query request can be sent in the form of an instruction) that includes a specific value of the service attribute is received.

After receiving the query instruction, the database server can read data from a disk based on the instruction. In the embodiments of this specification, the disk refers to a storage that stores data by using a magnetic recording technology, and includes a floppy disk or a hard disk.

In a storage process of the database server, a procedure of reading or writing data is usually to first send an instruction to notify the disk of a location of an initial sector, then provide a quantity of consecutive sectors (or one sector) to be read from the initial sector, and provide information indicating whether this is a reading or writing action. When receiving the instruction, the disk reads or writes data based on the instruction.

In this process, there is a continuous/random IO. Continuity and randomness mean Whether an address of the initial sector that is provided in a current IO and an address of an end sector that is provided in a previous IO are continuous or are separated by a small distance. If yes, the current IO should be considered as a continuous IO. Otherwise, the current IO is considered as a random IO.

A time used for an IO is equal to a track seeking time plus a data transfer time. The track seeking time is several orders of magnitude greater than the transfer time, and therefore a key factor that affects LOPS is to reduce the track seeking time. In the case of a continuous IO, a current initial sector is very close to a previous end sector, and therefore a magnetic head hardly needs to change a track or there is a very short time of changing a track. If the initial sector and the end sector are separated by an excessively large distance, the magnetic head needs a long time to change a track. If there are excessive random IOs, the magnetic head keeps changing tracks, and consequently efficiency is greatly reduced.

In the ledger in the embodiments of this specification, data blocks in the ledger are usually stored in the disk based on an order of sequence numbers. If one data block in the ledger and one sector in the disk occupy space approximately of the same size (or occupy a plurality of sectors), reading one data block at a time is equivalent to reading one sector from the disk. As described above, data of the user is usually irregular, and the user may store a large amount of data in a short time, and write the data into several adjacent data blocks. Alternatively, the user may store some data records at intervals, and therefore the data records are dispersed in the ledger.

Figure 4:
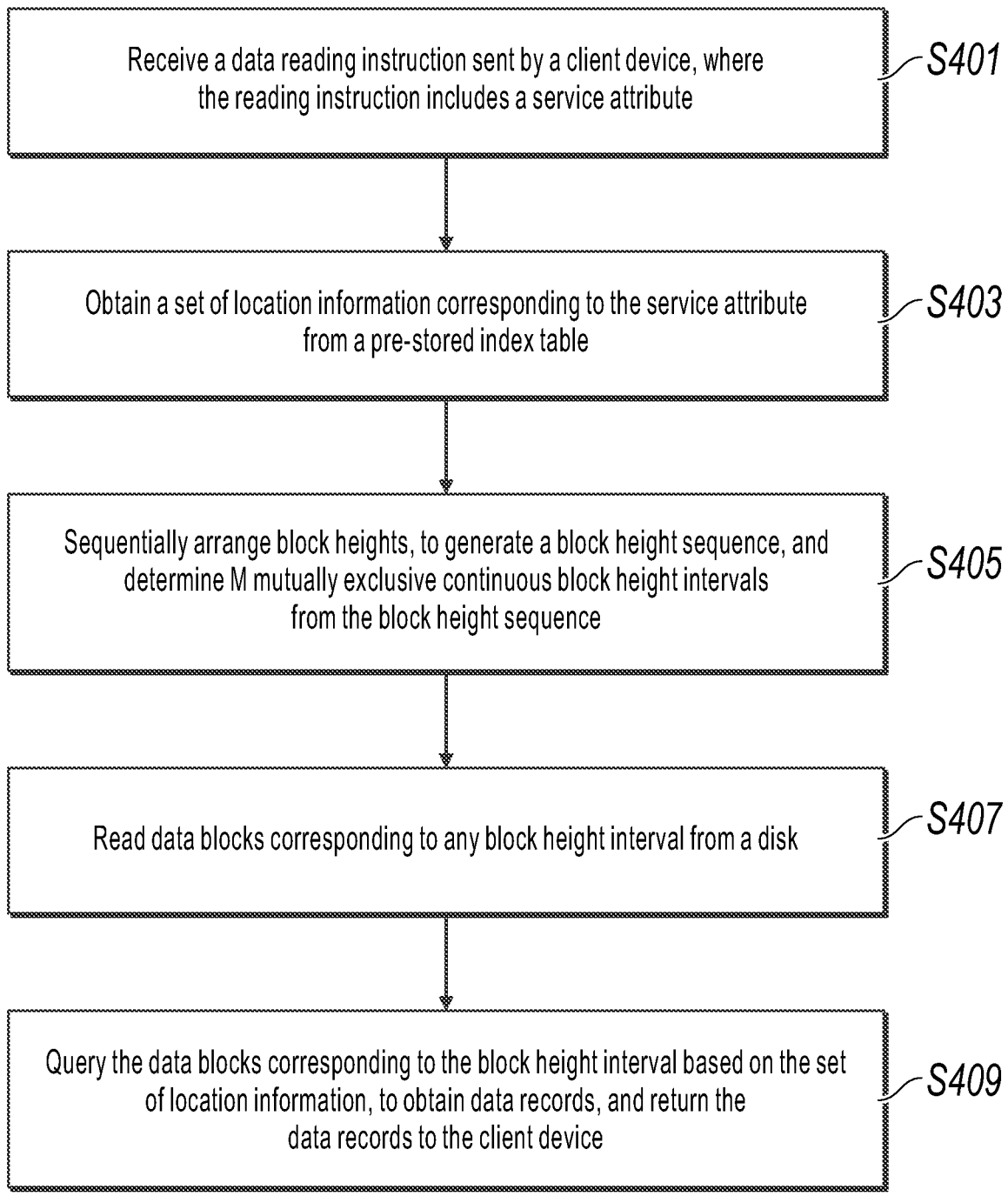
FIG. 4 is a schematic diagram illustrating a procedure of a disk storage-based data reading solution, according to embodiments of this specification.

In this case, if disk reading is sequentially and entirely performed based on block heights obtained through query, there is inevitably a random IO, and reading efficiency is significantly reduced when there is a large amount of data. Based on this, embodiments of this specification provide a data reading solution. FIG. 4 is a schematic diagram illustrating a procedure of a disk storage-based data reading solution, according to embodiments of this specification. The procedure specifically includes the following steps S401 to S409.

S401. Receive a data reading instruction sent by a client device, where the reading instruction includes a service attribute.

Data reading can come from a connected institution, or can come from a service user in a connected institution. In this case, a database can perform matching from an index table based on a specific value of the service attribute. For example, after Table 1 is created, a user enters a query instruction Retrieve (0X123456, &v, FULL).

S403. Obtain a set of location information corresponding to the service attribute from a pre-stored index table, where the location information includes block heights of data blocks in which data records are located and offsets in the data blocks in which the data records are located.

A database server can obtain location information (2, 08), (2, 10), (300, 89), and (300, 999) of corresponding data records of the user "0X123456" from the index table.

It is worthwhile to note that for ease of understanding, in Table 1, there is a small quantity of pieces of location information in the provided example. However, in actual applications, one service attribute usually corresponds to a large amount of location information.

S405. Sequentially arrange the block heights, to generate a block height sequence, and determine M mutually exclusive continuous block height intervals from the block height sequence.

The block height sequence is a sequence in which the block heights are sequentially arranged in ascending order. For example, for the location information (2, 08), (2, 10), (300, 89), (300, 999), obtained block heights 2 and 300 are sorted, to obtain a block height sequence "2, 300".

Certainly, in actual applications, there is a large amount of data, and the following block height sequence is usually obtained: "1, 2, 4, 5, 6, 9, 11, 13, 18, 23, 25, 27, 50, 51, 53, 55, 99, 130, 131, 155 . . . ". There may be tens of thousands of block heights or even a larger quantity of block heights. In this case, if all the block heights are sequentially read, it is clear that this is a random IO, resulting in excessively low efficiency.

Therefore, several mutually exclusive continuous block height intervals need to be obtained for the block height sequence. Mutual exclusion means that the block height intervals do not include the same block height, in other words, the block height intervals do not overlap.

A rule of determining the block height interval is that there should not be a large quantity of invalid block heights (namely, block heights that fall outside the block height sequence) in the block height interval. Otherwise, excessive invalid blocks are read, which also affects efficiency of reading the data record. Based on this rule, embodiments of this specification provide an example method for determining the block height interval. Details are as follows:

The block height series is traversed, intervals between two block heights are sequentially determined starting from a sequence number for which a block height interval to which the sequence number belongs is to be determined, and a former block height in two block heights whose interval is less than a predetermined value is used as an interval start point $S_M$; and intervals between two block heights are sequentially determined starting from the block height $S_M$, a former block height in two block heights whose interval is greater than the predetermined value is used as an interval end point $E_M$, and an Mth block height interval [$S_M$, $E_M$] is generated.

The previous block height sequence "1, 2, 4, 5, 6, 9, 11, 13, 18, 23, 25, 27, 50, 51, 53, 55, 99, 130, 131, 155 . . . " is used as an example.

During determining of a first block height interval, intervals of arrays (1, 2), (2, 4), (4, 5), (5, 6) . . . are sequentially verified starting from the first block height "1" in the sequence. If a predetermined interval distance is 3, it can be seen that the first array (1, 2) satisfies the condition, and therefore the former block height "1" in the array is used as an interval start point $S_M$. The predetermined interval distance is exceeded for the array (13, 18), and therefore the former block height "13" in the array is used as an interval end point $E_M$, to obtain the first block height interval [1, 13].

After the first block height interval [1, 13] is obtained, it can be determined that block heights to which all block heights before 13 belong are determined for all the block heights before 13. Therefore, a next block height interval is determined starting from the sequence number 18. An interval of the array (18, 23) exceeds the predetermined value 3, and therefore "18" here is not included in the block height interval, the second block height interval is determined as [23, 27], a third block height interval is determined as [50, 55], a fourth block height interval is determined as [130, 131], and by analogy, until the last block height in the block height sequence is read.

S407. Read data blocks corresponding to any block height interval from a disk.

For the obtained continuous block height interval, as described above, data blocks are not continuously stored, in other words, the data blocks are stored in the disk in an order of block heights, and therefore batches of data blocks can be continuously read from the disk based on the order. Although there are some invalid data blocks (namely, data blocks that do not include a data record of the user), there is a small quantity of invalid data blocks in the block height interval based on the previous rule, and a quantity of times a magnetic head in the disk in the IO changes a track is reduced through continuous reading, thereby improving efficiency of reading the data block.

The read data blocks are placed in a cache or a memory of the database server, and reading/writing efficiency in the cache or the memory is much higher than that in the disk. In other words, the small quantity of read valid data blocks basically exerts no impact on a reading/writing speed in the memory.

In addition, it is worthwhile to note that not all the block heights in the block height sequence can be included in the block height interval, for example, the block heights "18" and "99". The scattered block heights that fall outside the block height interval cannot be discarded and not read, and can still be randomly read one by one.

S409. Query the data blocks corresponding to the block height interval based on the set of location information, to obtain data records, and return the data records to the client device. Specifically, in the memory, the block heights and the of obtained in step S402 can be obtained by querying the read data blocks one by one.

In the solution provided in the embodiments of this specification, when the database server reads data from the disk, block heights corresponding to a service attribute are first sorted, to obtain a block height sequence, then a plurality of block height intervals are obtained from the block height sequence, and full data blocks corresponding to the block height intervals are continuously read from the disk, and then data records are read from the data blocks based on location information. As such, a quantity of times a track is changed is reduced during reading from the disk, and IO efficiency of the disk is improved, and therefore efficiency of reading the blockchain-type ledger stored in the disk is improved.

In implementations, to improve grouping efficiency, the block height interval is generated, block height intervals that include an excessively small quantity of valid block heights (namely, block heights in the block height sequence) can be filtered out by using a predetermined condition. For example, a predetermined quantity of valid block heights is 4. In this case, it can be seen that the block height interval [150, 151] includes only two block heights, and therefore does not need to be read as a continuous interval. A changeable filtering method can be to set a condition: A length of a block height interval is not less than a predetermined value. For example, the length of the block height interval is not less than 4. As such, block height intervals that include a small quantity of valid block heights can also be filtered out. In this method, the grouping efficiency of the block height sequence can be improved, and therefore the reading speed can be increased.

Figure 5:
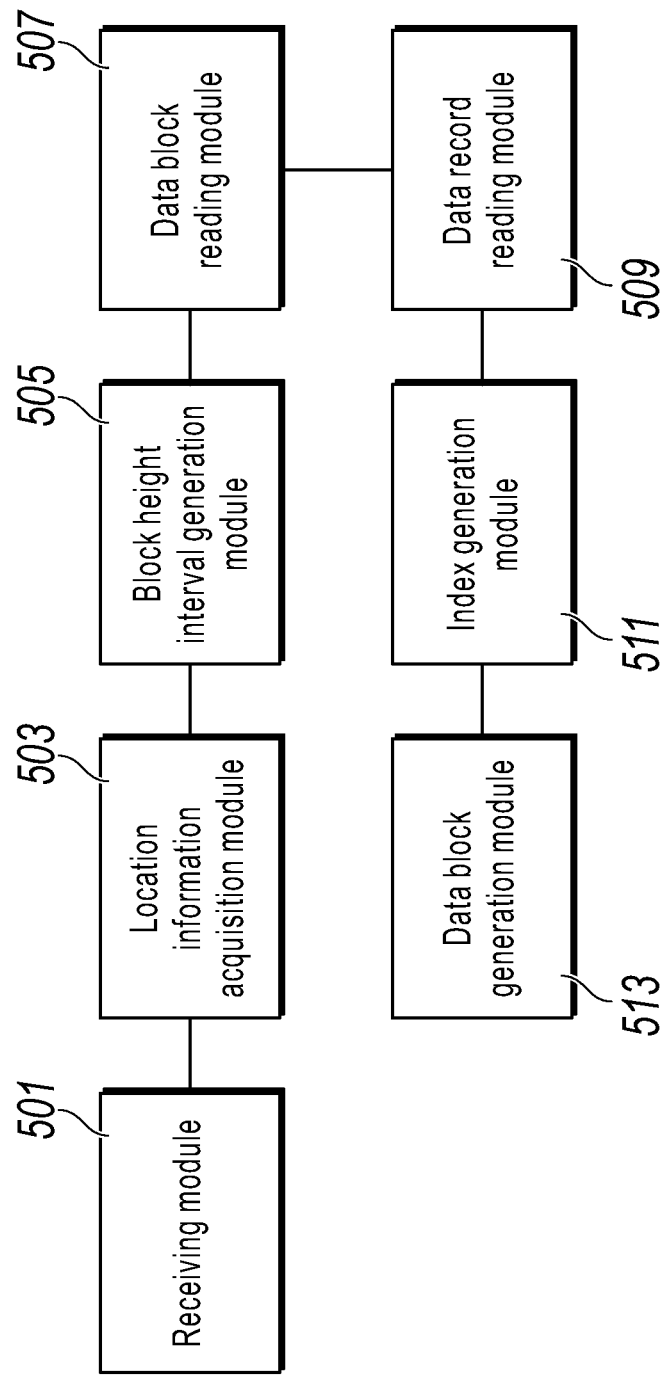
FIG. 5 is a schematic diagram illustrating a structure of a disk storage-based data reading apparatus, according to embodiments of this specification.

Correspondingly, embodiments of this specification further provide a disk storage-based data reading apparatus. FIG. 5 is a schematic diagram illustrating a structure of a disk storage-based data reading apparatus, according to embodiments of this specification. The data reading apparatus includes the following modules.

A receiving module 501 is configured to receive a data reading instruction sent by a client device. The reading instruction includes a service attribute.

A location information acquisition module 503 is configured to obtain a set of location information corresponding to the service attribute from a pre-stored index table. The location information includes block heights of data blocks in which data records are located and offsets in the data blocks in which the data records are located.

A block height interval veneration module 305 is configured to sequentially arrange the block heights, to generate a block height sequence, and determine M mutually exclusive continuous block height intervals from the block height sequence.

A data block reading module 507 is configured to read data blocks corresponding to any block height interval from a disk.

A data record reading module 309 is configured to query the data blocks corresponding to the block height interval based on the set of location information, to obtain data records, and return the data records to the client device.

Further, the block height interval generation module 505 is configured to traverse the block height series, sequentially determine intervals between two block heights starting from a sequence number for which a block height interval to which the sequence number belongs is to be determined, and use a former block height in two block heights whose interval is less than a predetermined value as an interval start point $S_M$; and sequentially determine intervals between two block heights starting from the block height $S_M$, use a former block height in two block heights whose interval is greater than the predetermined value as an interval end point $E_M$, and generate an Mth block height interval [$S_M$, $E_M$].

Further, the block height interval generation module 505 is configured to determine a quantity K of block heights that are in both the block height sequence and the block height interval, and generate the Mth block height interval [$S_M$, $E_M$] when the quantity K of block heights is not less than a predetermined value.

Further, the apparatus further includes an index generation module 511, configured to obtain a service attribute included in any data record in a blockchain-type ledger; determine location information of the data record in the ledger, where the location information includes a block height of a data block in which the data record is located and an offset in the data block in which the data record is located; and establish a correspondence between the service attribute and the location information, and write an index in which the service attribute is used as a primary key.

Further, the index generation module 511 is configured to determine timestamps of data records; and in the same index record, sequentially write location information of the data records into a value in the index record based on an order of the timestamps.

Further, the apparatus further includes a data block generation module 513, configured to receive to-be-stored data records, and determine a hash value of each data record, where the data record includes a service attribute; and when a predetermined block generation condition is satisfied, determine data records to be written into a data block, and generate an Nth data block that includes a hash value of the data block and the data records. This specifically includes the following: When N=1, the hash value and a block height of the initial data block are given based on a predetermined method; or when N>1, the hash value of the Nth data block is determined based on the data records to be written into the data block and a hash value of an (N−1)th data block, and the Nth data block that includes the hash value of the Nth data block and the data records is generated, where the block height of the data block monotonically increases based on a block generation time order.

Further, the predetermined block generation condition includes: A quantity of to-be-stored data records reaches a quantity threshold; or a time interval from a previous block generation moment reaches a time threshold.

Embodiments of this specification further provide a computer device. The computer device includes at least a storage, a processor, and a computer program that is stored in the storage and can run on the processor. When the processor executes the program, the data reading method shown in FIG. 4 is implemented.

Figure 6:
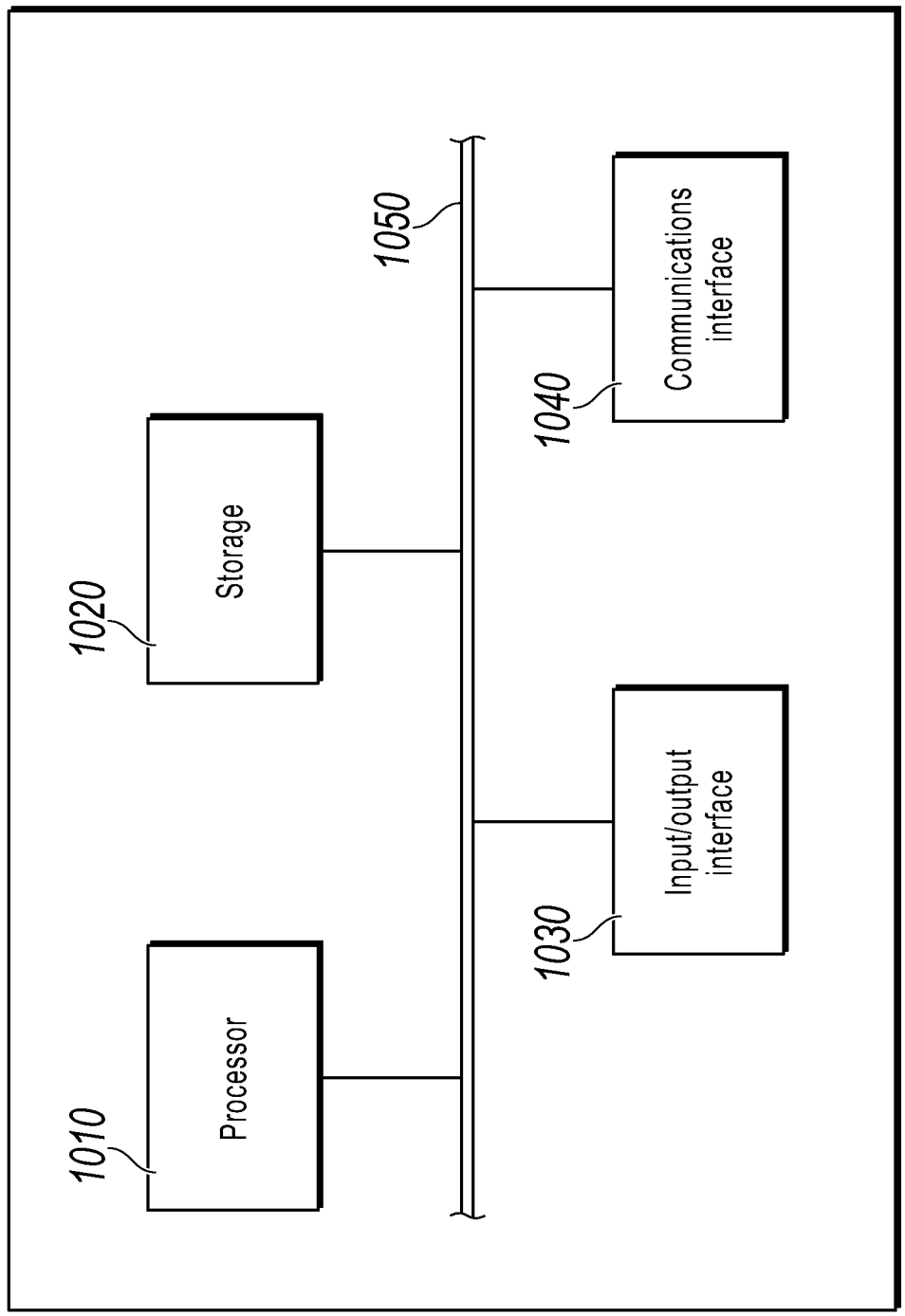
FIG. 6 is a schematic diagram illustrating a structure of a device for configuring methods in embodiments of this specification.

FIG. 6 is a schematic diagram illustrating a more specific hardware structure of a computing device, according to embodiments of this specification. The device can include a processor 1010, a storage 1020, an input/output interface 1030, a communications interface 1040, and a bus 1050. The processor 1010, the storage 1020, the input/output interface 1030, and the communications interface 1040 implement communications connection with each other within the device by using the bus 1050.

The processor 1010 can be implemented by using a general-purpose central processing unit (CPU), a microprocessor, an application-specific integrated circuit (ASIC), one or more integrated circuits, etc., and is configured to execute a related program to implement the technical solutions provided in the embodiments of this specification.

The storage 1020 can be implemented in a form of a read-only memory (ROM), a random access memory (RAM), a static storage device, a dynamic storage device, etc. The storage 1020 can store an operating system and other applications. When the technical solutions provided in the embodiments of this specification are implemented by software or firmware, related program code is stored in the storage 1020 and is invoked and executed by the processor 1010.

The input/output interface 1030 is configured to connect an input/output module to input and output information. The input/output/module can be configured as a component (not shown in the figure) in the device or externally connected to the device to provide corresponding functions. Input devices can include a keyboard, a mouse, a touchscreen, microphone, various sensors, etc. Output devices can include a display, a speaker, a vibrator, an indicator, etc.

The communications interface 1040 is configured to connect to a communications module (not shown) to implement communications interaction between the device and other devices. The communications module can communicate in a wired way (such as a USB or a network cable) or a wireless way (such as a mobile network, WIFI, or Bluetooth).

The bus 1050 includes a channel for transmitting information between components (such as the processor 1010, the memory 1020, the input/output interface 1030, and the communications interface 1040) of the device.

It is worthwhile to note that although the device shows only the processor 1010, the storage 1020, the input/output interface 1030, the communications interface 1040, and the bus 1050, in a specific implementation process, the device can further include other components necessary to implement normal operation. In addition, a person skilled in the art can understand that the device can include only components necessary to implement the embodiments of this specification, and does not necessarily include all the components shown in the figure.

Embodiments of this specification further provide a computer-readable storage medium. The computer-readable storage medium stores a computer program, and when the program is executed by a processor, the data reading method shown in FIG. 4 is implemented.

The computer-readable medium includes persistent, non-persistent, removable, and irremovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage or another magnetic storage device, or any other non-transmission medium. The computer storage medium can be used to store information accessible by a computing device. Based on the definition in this specification, the computer-readable medium does not include transitory computer readable media (transitory medial such as a modulated data signal and carrier.

It can be seen from the previous description of the implementations that a person skilled in the art can clearly understand that the embodiments of this specification can be implemented by software in addition to a necessary universal hardware platform. Based on such an understanding, the technical solutions of the embodiments of this specification, essentially or the part contributing to the existing technology, can be embodied in a form of a software product. The software program product can be stored in a storage medium such as a ROM/RAM, a hard disk, or a compact disc, and includes several instructions for instructing a computer device (which can be a personal computer, a server, or a network device) to execute the methods described in the embodiments or some of the embodiments of this specification.

The system, method, module, or unit illustrated in the previously described embodiments can be specifically implemented by a computer chip or an entity, or can be implemented by a product having a certain function. A typical implementation device is a computer. Specific forms of the computer can be a personal computer, a laptop computer, a cellular phone, a camera phone, a smartphone, a personal digital assistant, a media player, a navigation device, an e-mail transceiver, a game console, a tablet computer, a wearable device, or any combination of several of these devices.

The embodiments of this specification are described in a progressive way. For same or similar parts in the embodiments, references can be made to these embodiments, and each embodiment focuses on a difference from other embodiments. In particular, the method embodiments are basically similar to the method embodiments, and therefore are described briefly. For related parts, references can be made to partial description in the method embodiments. The described method embodiments are merely examples. The modules described as separate parts may or may not be physically separate. The functions of the modules can be implemented in same or different software or hardware when implementing the solutions of the embodiments of this specification. Some or all of the modules can be selected based on actual needs to achieve the objectives of the embodiments. A person of ordinary skill in the art can understand and implement this specification without creative efforts.

The previous descriptions are merely specific implementations of the embodiments of this specification. It is worthwhile to note that a person of ordinary skill in the art can make some improvements and modifications without departing from the principle of the embodiments of this specification. These improvements and modifications shall also fall within the protection scope of the embodiments of this specification.

What is claimed is:

1. A computer-implemented method, comprising:
   receiving, from a client device, a data reading instruction to read one or more data records, wherein the one or more data records are stored in data blocks of a blockchain-type ledger, the data blocks are arranged based on a block generation time order in which the data blocks are generated, the data blocks have respective block heights that are monotonically increasing numbers based on the block generation time order, and the data reading instruction comprises a service attribute comprised in the one or more data records;
   obtaining location information corresponding to the service attribute from a pre-stored index table, wherein the location information comprises the block heights of the data blocks in which the one or more data records are located and offsets in the data blocks in which the one or more data records are located;
   generating a block height sequence by sequentially arranging the block heights of the data blocks, wherein the block height sequence is a sequence of monotonically increasing numbers indicating the block generation time order in which the data blocks are generated;
   determining mutually exclusive continuous block height intervals by traversing the block height sequence, wherein the mutually exclusive continuous block height intervals do not include a same block height and each mutually exclusive continuous block height interval includes less than a threshold number of invalid block heights, wherein the invalid block heights are block heights that fall outside the block height sequence, wherein the determining the mutually exclusive continuous block height intervals by traversing the block height sequence comprises:
   determining an Mth block height interval $[S_M, E_M]$, wherein $S_M$ and $E_M$ are two block heights in the block height sequence, $S_M$ is an interval start point of the Mth block height interval, and $E_M$ is an interval end point of the Mth block height interval;
   reading one or more target data blocks corresponding to a block height interval from a disk, wherein the block height interval is one of the mutually exclusive continuous block height intervals;
   obtaining the one or more data records by querying the one or more target data blocks corresponding to the block height interval based on the location information; and
   returning the one or more data records to the client device.

2. The computer-implemented method of claim 1, wherein
   determining the Mth block height interval $[S_M, E_M]$ comprises:
      sequentially determining one or more intervals between two block heights in the block height sequence by traversing the block height sequence, starting from a candidate block height;
      using a former block height of two block heights whose interval is less than a predetermined value as the interval start point $S_M$;
      sequentially determining one or more additional intervals between two block heights in the block height sequence by traversing the block height sequence starting from the interval start point $S_M$; and
      using a former block height of two block heights whose interval is greater than the predetermined value as the interval end point $E_M$.

3. The computer-implemented method of claim 2, wherein the determining the Mth block height interval $[S_M, E_M]$ further comprises:
   determining a quantity of block heights that are in both the block height sequence and the block height interval $[S_M, E_M]$;
   determining that the quantity of block heights is not less than a predetermined threshold; and
   in response, generating the Mth block height interval $[S_M, E_M]$.

4. The computer-implemented method of claim 1, wherein the pre-stored index table is generated by:
   obtaining, from the blockchain-type ledger, a first service attribute comprised in a plurality of data records;
   determining location information of the plurality of data records in the blockchain-type ledger, wherein the location information of the plurality of data records comprises block heights of data blocks in which the plurality of data records are located and offsets in the data blocks in which the plurality of data records are located;
   establishing a correspondence between the first service attribute and the location information of the plurality of data records; and
   writing an index record of the pre-stored index table, wherein the first service attribute serves as a key for the index record, wherein the index record comprises the location information of the plurality of data records.

5. The computer-implemented method of claim 4, wherein the writing the index record of the pre-stored index table comprises:
   determining timestamps of the plurality of data records; and
   sequentially writing the location information of the plurality of data records in a same index record based on an order of the timestamps.

6. The computer-implemented method of claim 4, wherein the data blocks in which the plurality of data records are located in the blockchain-type ledger are generated by:
   receiving to-be-stored data records;
   determining a hash value of each of the to-be-stored data records, wherein each of the to-be-stored data records comprises a second service attribute; and
   in response to determining that a predetermined block generation condition is satisfied, determining candidate data records to be written into a data block, and generating an Nth data block that comprises a hash value of the Nth data block and the candidate data records, wherein determining the candidate data records to be written into the data block and generating the Nth data block that comprises the hash value of the Nth data block and the candidate data records comprises:
      when N=1, the hash value and a block height of an initial data block are given based on a predetermined method; or
      when N>1, the hash value of the Nth data block is determined based on the candidate data records to be written into the Nth data block and a hash value of an (N−1)th data block, and the Nth data block that comprises the hash value of the Nth data block and the candidate data records is generated, wherein the block heights of the data blocks in which the plurality of data records are located monotonically increase based on an order of generation times of the data blocks.

7. The computer-implemented method of claim 6, wherein the predetermined block generation condition comprises:
   a quantity of the to-be-stored data records reaches a quantity threshold; or a time interval from a previous block generation moment reaches a time threshold.

8. A non-transitory, computer-readable medium storing one or more instructions executable by a computer system to perform operations comprising:
   receiving, from a client device, a data reading instruction to read one or more data records, wherein the one or more data records are stored in data blocks of a blockchain-type ledger, the data blocks are arranged based on a block generation time order in which the data blocks are generated, the data blocks have respective block heights that are monotonically increasing numbers based on the block generation time order, and the data reading instruction comprises a service attribute comprised in the one or more data records;
   obtaining location information corresponding to the service attribute from a pre-stored index table, wherein the location information comprises the block heights of the data blocks in which the one or more data records are located and offsets in the data blocks in which the one or more data records are located;
   generating a block height sequence by sequentially arranging the block heights of the data blocks, wherein the block height sequence is a sequence of monotonically increasing numbers indicating the block generation time order in which the data blocks are generated;
   determining mutually exclusive continuous block height intervals by traversing the block height sequence, wherein the mutually exclusive continuous block height intervals do not include a same block height and each mutually exclusive continuous block height interval includes less than a threshold number of invalid block heights, wherein the invalid block heights are block heights that fall outside the block height sequence, wherein the determining the mutually exclusive continuous block height intervals by traversing the block height sequence comprises:
      determining an Mth block height interval $[S_M, E_M]$, wherein $S_M$ and $E_M$ are two block heights in the block height sequence, $S_M$ is an interval start point of the Mth block height interval, and $E_M$ is an interval end point of the Mth block height interval;
   reading one or more target data blocks corresponding to a block height interval from a disk, wherein the block height interval is one of the mutually exclusive continuous block height intervals;
   obtaining the one or more data records by querying the one or more target data blocks corresponding to the block height interval based on the location information; and
   returning the one or more data records to the client device.

9. The computer-readable medium of claim 8, wherein determining the Mth block height interval $[S_M, E_M]$ comprises:
   sequentially determining one or more intervals between two block heights in the block height sequence by traversing the block height sequence, starting from a candidate block height;
   using a former block height of two block heights whose interval is less than a predetermined value as the interval start point $S_M$;
   sequentially determining one or more additional intervals between two block heights in the block height sequence by traversing the block height sequence starting from the interval start point $S_M$; and
   using a former block height of two block heights whose interval is greater than the predetermined value as the interval end point $E_M$.

10. The computer-readable medium of claim 9, wherein the determining the Mth block height interval $[S_M, E_M]$ further comprises:
   determining a quantity of block heights that are in both the block height sequence and the block height interval $[S_M, E_M]$;
   determining that the quantity of block heights is not less than a predetermined threshold; and
   in response, generating the Mth block height interval $[S_M, E_M]$.

11. The computer-readable medium of claim 8, wherein the pre-stored index table is generated by:
   obtaining, from the blockchain-type ledger, a first service attribute comprised in a plurality of data records;
   determining location information of the plurality of data records in the blockchain-type ledger, wherein the location information of the plurality of data records comprises block heights of data blocks in which the plurality of data records are located and offsets in the data blocks in which the plurality of data records are located;

establishing a correspondence between the first service attribute and the location information of the plurality of data records; and writing an index record of the pre-stored index table, wherein the first service attribute serves as a key for the index record, wherein the index record comprises the location information of the plurality of data records.

12. The computer-readable medium of claim 11, wherein the writing the index record of the pre-stored index table comprises:

determining timestamps of the plurality of data records; and sequentially writing the location information of the plurality of data records in a same index record based on an order of the timestamps.

13. The computer-readable medium of claim 11, wherein the data blocks in which the plurality of data records are located in the blockchain-type ledger are generated by:

receiving to-be-stored data records;

determining a hash value of each of the to-be-stored data records, wherein each of the to-be-stored data records comprises a second service attribute; and in response to determining that a predetermined block generation condition is satisfied, determining candidate data records to be written into a data block, and generating an Nth data block that comprises a hash value of the Nth data block and the candidate data records, wherein determining the candidate data records to be written into the data block and generating the Nth data block that comprises the hash value of the Nth data block and the candidate data records comprises:

when N=1, the hash value and a block height of an initial data block are given based on a predetermined method; or when N>1, the hash value of the Nth data block is determined based on the candidate data records to be written into the Nth data block and a hash value of an (N−1)th data block, and the Nth data block that comprises the hash value of the Nth data block and the candidate data records is generated, wherein the block heights of the data blocks in which the plurality of data records are located monotonically increase based on an order of generation times of the data blocks.

14. The computer-readable medium of claim 13, wherein the predetermined block generation condition comprises:

a quantity of the to-be-stored data records reaches a quantity threshold; or a time interval from a previous block generation moment reaches a time threshold.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from a client device, a data reading instruction to read one or more data records, wherein the one or more data records are stored in data blocks of a blockchain-type ledger, the data blocks are arranged based on a block generation time order in which the data blocks are generated, the data blocks have respective block heights that are monotonically increasing numbers based on the block generation time order, and the data reading instruction comprises a service attribute comprised in the one or more data records;

obtaining location information corresponding to the service attribute from a pre-stored index table, wherein the location information comprises the block heights of the data blocks in which the one or more data records are located and offsets in the data blocks in which the one or more data records are located;

generating a block height sequence by sequentially arranging the block heights of the data blocks, wherein the block height sequence is a sequence of monotonically increasing numbers indicating the block generation time order in which the data blocks are generated;

determining mutually exclusive continuous block height intervals by traversing the block height sequence, wherein the mutually exclusive continuous block height intervals do not include a same block height and each mutually exclusive continuous block height interval includes less than a threshold number of invalid block heights, wherein the invalid block heights are block heights that fall outside the block height sequence, wherein the determining the mutually exclusive continuous block height intervals by traversing the block height sequence comprises:

determining an Mth block height interval $[S_M, E_M]$, wherein $S_M$ and $E_M$ are two block heights in the block height sequence, $S_M$ is an interval start point of the Mth block height interval, and $E_M$ is an interval end point of the Mth block height interval;

reading one or more target data blocks corresponding to a block height interval from a disk, wherein the block height interval is one of the mutually exclusive continuous block height intervals;

obtaining the one or more data records by querying the one or more target data blocks corresponding to the block height interval based on the location information; and returning the one or more data records to the client device.

16. The computer-implemented system of claim 15, wherein determining the Mth block height interval $[S_M, E_M]$ comprises:

sequentially determining one or more intervals between two block heights in the block height sequence by traversing the block height sequence, starting from a candidate block height;

using a former block height of two block heights whose interval is less than a predetermined value as the interval start point $S_M$;

sequentially determining one or more additional intervals between two block heights in the block height sequence by traversing the block height sequence starting from the interval start point $S_M$; and using a former block height of two block heights whose interval is greater than the predetermined value as the interval end point $E_M$.

17. The computer-implemented system of claim 16, wherein the determining the Mth block height interval $[S_M, E_M]$ further comprises:

determining a quantity of block heights that are in both the block height sequence and the block height interval $[S_M, E_M]$;

determining that the quantity of block heights is not less than a predetermined threshold; and in response, generating the Mth block height interval $[S_M, E_M]$.

18. The computer-implemented system of claim 15, wherein the pre-stored index table is generated by:

obtaining, from the blockchain-type ledger, a first service attribute comprised in a plurality of data records;

determining location information of the plurality of data records in the blockchain-type ledger, wherein the location information of the plurality of data records comprises block heights of data blocks in which the plurality of data records are located and offsets in the data blocks in which the plurality of data records are located;

establishing a correspondence between the first service attribute and the location information of the plurality of data records; and writing an index record of the pre-stored index table, wherein the first service attribute serves as a key for the index record, wherein the index record comprises the location information of the plurality of data records.

19. The computer-implemented system of claim 18, wherein the writing the index record of the pre-stored index table comprises:

determining timestamps of the plurality of data records; and sequentially writing the location information of the plurality of data records in a same index record based on an order of the timestamps.

20. The computer-implemented system of claim 18, wherein the data blocks in which the plurality of data records are located in the blockchain-type ledger are generated by:

receiving to-be-stored data records;

determining a hash value of each of the to-be-stored data records, wherein each of the to-be-stored data records comprises a second service attribute; and in response to determining that a predetermined block generation condition is satisfied, determining candidate data records to be written into a data block, and generating an Nth data block that comprises a hash value of the Nth data block and the candidate data records, wherein determining the candidate data records to be written into the data block and generating the Nth data block that comprises the hash value of the Nth data block and the candidate data records comprises:

when N=1, the hash value and a block height of an initial data block are given based on a predetermined method; or when N>1, the hash value of the Nth data block is determined based on the candidate data records to be written into the Nth data block and a hash value of an (N−1)th data block, and the Nth data block that comprises the hash value of the Nth data block and the candidate data records is generated, wherein the block heights of the data blocks in which the plurality of data records are located monotonically increase based on an order of generation times of the data blocks.

* * * * *